(12) United States Patent
Pedretti-Rodi

(10) Patent No.: US 11,592,211 B2
(45) Date of Patent: Feb. 28, 2023

(54) PROCESSING SYSTEM FOR RECOVERING HEAT, AND A METHOD FOR OPERATING SAME

(71) Applicant: Synhelion SA, Lugano (CH)

(72) Inventor: Andrea Pedretti-Rodi, Bellinzona (CH)

(73) Assignee: Synhelion S.A., Lugano (CH)

( * ) Notice: Subject to any disclaimer, the term of this patent is extended or adjusted under 35 U.S.C. 154(b) by 0 days.

(21) Appl. No.: 15/564,299

(22) PCT Filed: Apr. 8, 2016

(86) PCT No.: PCT/IB2016/052000
§ 371 (c)(1),
(2) Date: Oct. 10, 2017

(87) PCT Pub. No.: WO2016/162839
PCT Pub. Date: Oct. 13, 2016

(65) Prior Publication Data
US 2018/0135890 A1 May 17, 2018

(30) Foreign Application Priority Data
Apr. 8, 2015 (CH) ..................... 00487/15

(51) Int. Cl.
*F24S 60/00* (2018.01)
*F28D 20/00* (2006.01)
(Continued)

(52) U.S. Cl.
CPC ............... *F24S 60/00* (2018.05); *F24S 20/20* (2018.05); *F28D 17/04* (2013.01);
(Continued)

(58) Field of Classification Search
CPC ................. F28D 17/04; F28D 20/0056; F28D 2020/0008; F24S 20/20; F24S 60/00
(Continued)

(56) References Cited

U.S. PATENT DOCUMENTS

| 4,094,148 A | 6/1978 | Nelson |
| 4,265,223 A | 5/1981 | Miserlis et al. |

(Continued)

FOREIGN PATENT DOCUMENTS

| DE | 10260992 A1 * | 7/2004 | ............... F02C 6/18 |
| DE | 102008036527 A1 | 2/2010 | |

(Continued)

OTHER PUBLICATIONS

Mootz, Frank, International Search Report for PCT/IB2016/052000, dated Jul. 8, 2016, 3 pages.

(Continued)

*Primary Examiner* — David J Laux
(74) *Attorney, Agent, or Firm* — Henry Patent Law Firm PLLC

(57) ABSTRACT

The invention relates to a processing system comprising a processing unit (1, 60, 100) that can be operated between an upper (To) and a lower (Tu) temperature. A first heat accumulator (3, 61) and a second heat accumulator (4, 62) are operationally interconnected by means of a line arrangement (L) for a heat-transporting medium, said processing unit (1, 60, 100) being arranged in a first section (I) of said line arrangement (L) between the first (3, 61) and the second heat accumulator (4, 62).

16 Claims, 11 Drawing Sheets

Figure 1:
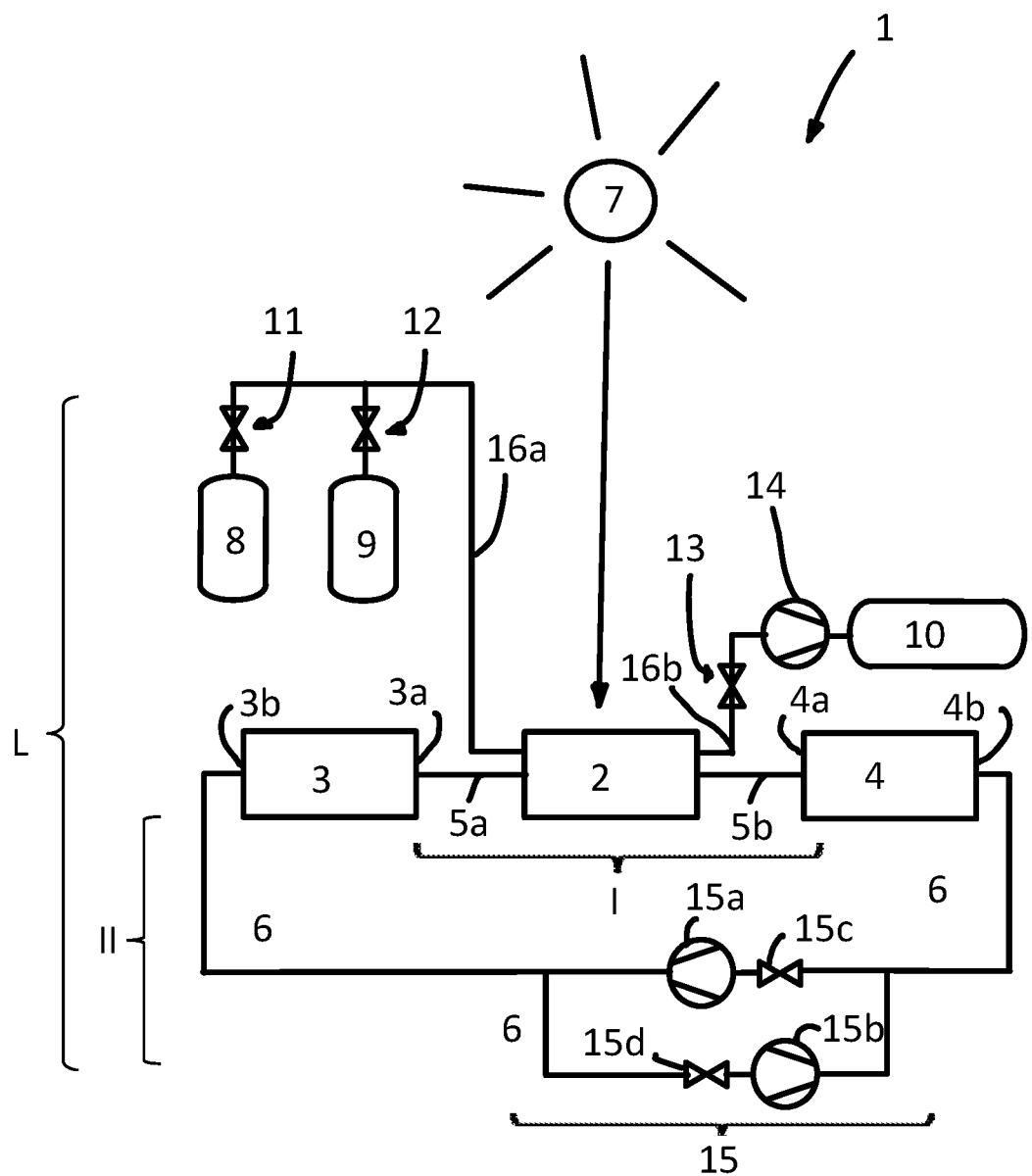

(51) Int. Cl.
*F24S 20/20* (2018.01)
*F28D 17/04* (2006.01)

(52) U.S. Cl.
CPC .. *F28D 20/0056* (2013.01); *F28D 2020/0008* (2013.01); *Y02E 10/40* (2013.01); *Y02E 60/14* (2013.01)

(58) Field of Classification Search
USPC ........................................................ 126/617
See application file for complete search history.

(56) References Cited

U.S. PATENT DOCUMENTS

| | | | |
|---|---|---|---|
| 5,237,827 A | | 8/1993 | Tchernev |
| 5,439,491 A | * | 8/1995 | Kubiak ................ C10J 3/482 48/101 |
| 2005/0126170 A1 | * | 6/2005 | Litwin ................ F03G 6/065 60/641.8 |
| 2011/0100611 A1 | | 5/2011 | Ohler et al. |
| 2013/0049368 A1 | | 2/2013 | Kaufmann et al. |
| 2013/0056170 A1 | | 3/2013 | Klemencic |
| 2013/0307273 A1 | | 11/2013 | Afremov et al. |
| 2015/0021158 A1 | * | 1/2015 | Nakagawa ............ C10B 57/10 202/96 |
| 2015/0345854 A1 | * | 12/2015 | Brendelberger ........ F24S 80/20 62/4 |
| 2016/0069218 A1 | * | 3/2016 | Lenk ................... F01K 13/02 60/39.5 |
| 2018/0106165 A1 | * | 4/2018 | Barmeier ................ F01K 3/12 |
| 2019/0154357 A1 | | 5/2019 | Pedretti-Rodi |

FOREIGN PATENT DOCUMENTS

| | | | | |
|---|---|---|---|---|
| DE | 102010053902 A1 | * | 6/2012 | ............ F28D 20/00 |
| WO | WO-2011/072410 A1 | | 6/2011 | |
| WO | WO-2014/062464 A1 | | 4/2014 | |
| WO | WO-2016150461 A1 | * | 9/2016 | ............ F28F 27/00 |
| WO | WO-2016/162839 A1 | | 10/2016 | |

OTHER PUBLICATIONS

International Search Report; dated Aug. 4, 2017; Authorized Officer—Frank Mootz; 3 pages.
Furler, Philippe, "Solar Thermochemical CO2 and H2O Splitting via Ceria Redox Reactions", ETH Dissertation No. 21864 (2014) [202 pages].

* cited by examiner

PROCESSING SYSTEM FOR RECOVERING HEAT, AND A METHOD FOR OPERATING SAME

The present invention relates to a processing system with a processing unit that can be operated between an upper and a lower temperature and a method for cyclic heating and cooling of a processing unit that can be operated between an upper and a lower temperature.

Processes that take place at different temperature levels are used widely in the art. In this context one process step takes place at an upper temperature and another process step takes place at a lower temperature, or a process step may also take place during the temperature change. Many applications are associated with the case in which a chemical reaction takes place with the aid of a catalyst. Then, it is often practical to heat a processing unit to an upper temperature range and then cool it to a lower temperature range, and to repeat this temperature change cyclically for continuous production.

One of the many applications is in the field of manufacturing solar fuels, for which the source substances $H_2$ (hydrogen) and CO (carbon monoxide) are formed from $H_2O$ (water) and $CO_2$ (carbon dioxide) when energy—specifically heat at high temperatures—is supplied. A gas mixture containing mainly $H_2$ and CO—as well as other gases—is called synthesis gas, or simply syngas. This syngas is used to produce liquid or gas-phase hydrocarbon fuels.

In ETH dissertation No. 21864 "SOLAR THERMAL CHEMICAL CO2 AND H2O SPLITTING VIA CERIA REDOX REACTIONS" by Philipp Furler, an experimental solar cerium reactor is described with which synthesis gas can be produced by irradiation with concentrated sunlight (2865 suns, that is to say thermal radiation of up to 2865 kW/m$^2$).

Sunlight in the concentration described above can be produced on an industrial scale, with the applicant's dish concentrator according to WO 2011/072410, for example, so that the commercial production of synthesis gas using renewable or recoverable energy has become realistic.

According to the ETH dissertation sited above, cerium is reduced in a first, endothermic process step up to an upper temperature of 1800 K, forming oxygen; then, after completion of the reduction reaction the cerium is cooled to a lower temperature of 1100 K and the synthesis gas is produced in a subsequent process step by exothermic reoxidation; in this process, much more endothermic heat is required than the exothermic heat produced. This process can be repeated cyclically for continuous production of synthesis gas; for this, the cerium must periodically be heated consistently to 1800 K and cooled to 1100 K. In order to recover the heat that is removed by cooling, a double-ring structure of a cerium-carrier is suggested. Two counter-rotating, abutting cerium rings with a common axis of rotation are located between the warm zone (1800 K) and the cold zone (1100 K) in such manner that a portion of each ring at the 12 o'clock position is located in the warm zone and an opposite portion at the 6 o'clock position is in the cold zone. A counter-rotating movement of immediately adjacent cerium rings moves the cold portion of a first cerium ring clockwise towards the warm zone and the warm portion to the cold zone, and the cold portion of a second Ce ring rotating counter-clockwise also migrates towards the hot zone while the warm portion thereof moves towards the cold zone, and the two cerium rings brush past each other, thereby exchanging heat energy continuously. Accordingly, warm portions cool each other and cold portions heat each other, enabling recovery of a quantity of heat. However, the efficiency of the recovery is low due to the design of the apparatus, and is approximately 25%. The requirements imposed on the design and the stability of counter-rotating, abutting cerium rings—heat transfer, heat dissipation and mechanical costs—are high.

Similar problems to those described above are also encountered in other areas of the prior art when a processing unit is to be operated at different temperatures and heat is to be recovered when cooling.

The object of the invention is therefore to further develop a processing system with a processing unit which is operable between an upper and a lower temperature so that heat can be recovered more effectively. It should also be possible to use the processing system inter alia for temperatures above 1000 K, so that the processing unit may be designed as a reactor for synthesis gas, for example.

For the processing system, two heat accumulators are provided, between which the processing unit is located, a heat accumulator may be discharged for heating the processing unit, and heat which is not absorbed by the processing unit heat may be used to charge the second heat accumulator—and similarly for cooling the processing unit. This enables losses to be reduced and so increase efficiency.

Since the direction of flow between the heat accumulator, and thus also through the processing unit changes cyclically, the heat present in the system heat can be moved back and forth through the processing unit alternately, heating and cooling it by turns, thus enabling the processing unit to be designed more simply besides enabling improved efficiency.

For the method, the object underlying the invention is further solved by the method according to Claim 13. Since the direction of flow between the heat accumulator, and thus also through the processing unit changes cyclically, the heat present in the system heat can be moved back and forth through the processing unit alternately, heating and cooling it by turns, thus enabling the processing unit to be designed more simply besides enabling improved efficiency.

Preferred embodiments of the present invention have the features of the dependent Claims 14 to 16.

Figure 2:
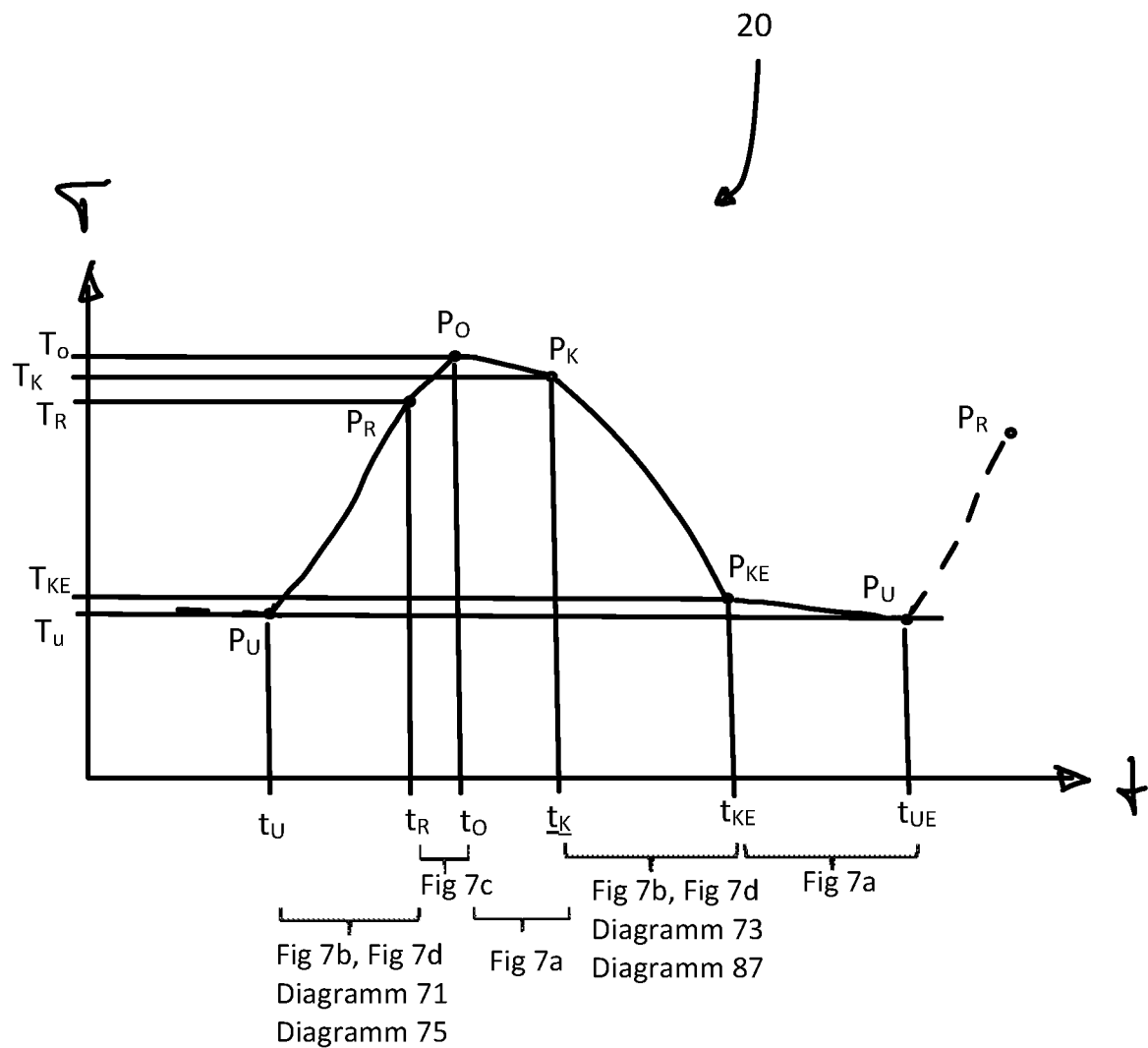
Figure 3:
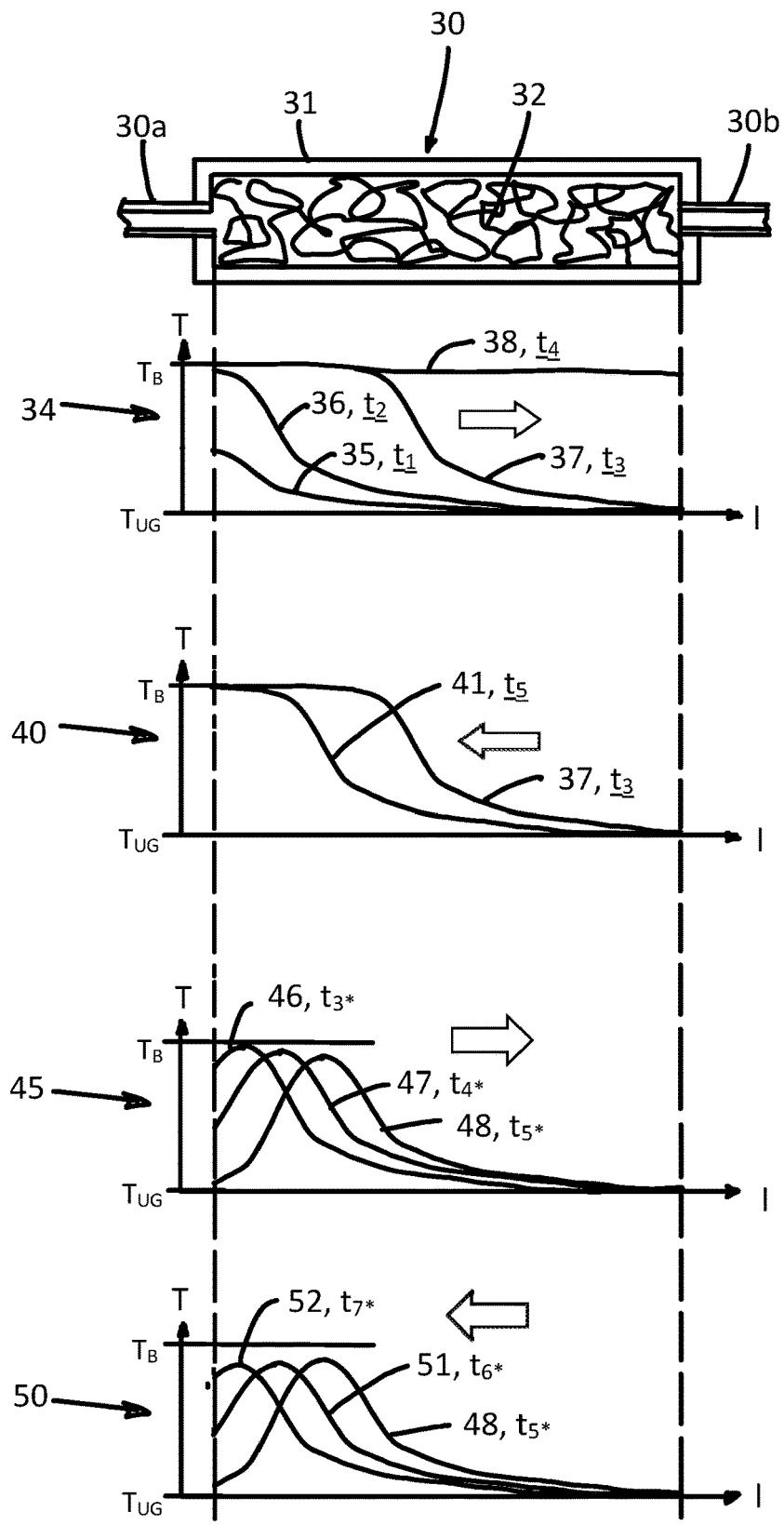
Figure 4:
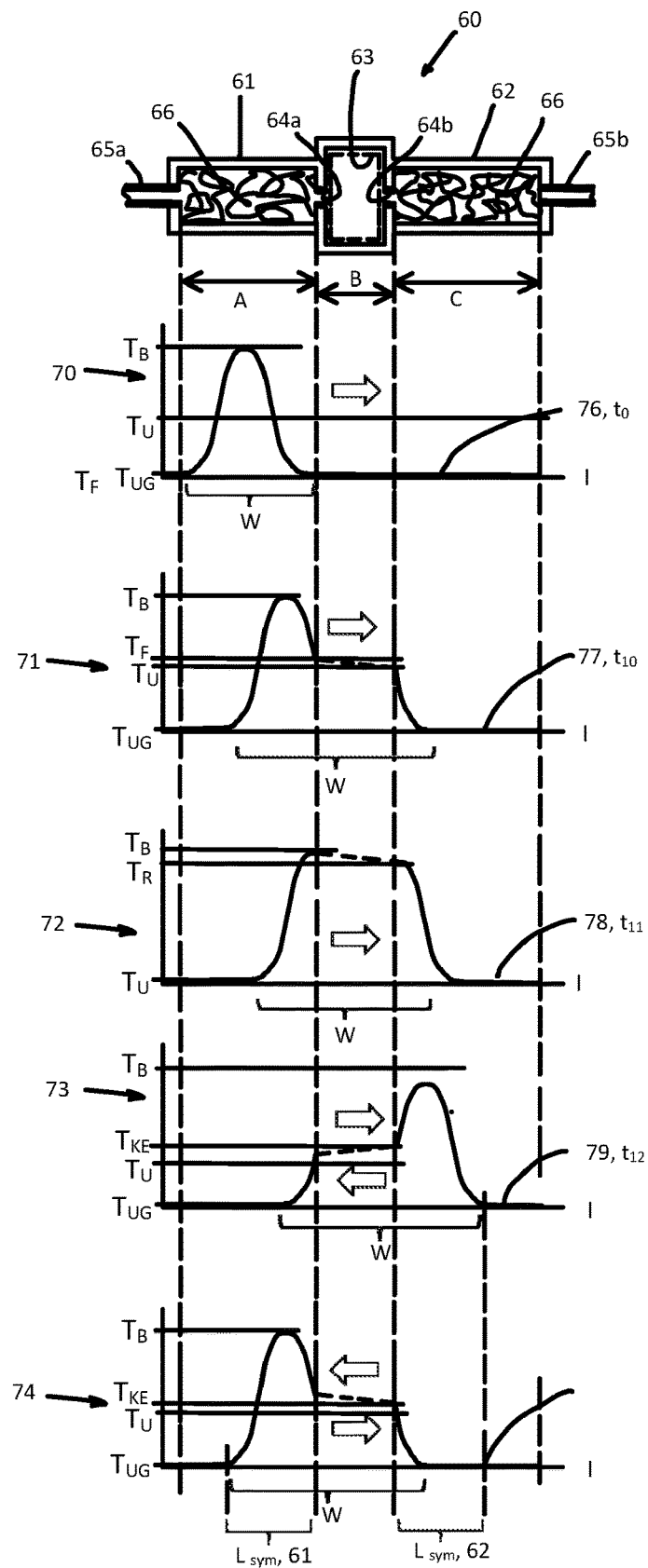
Figure 5:
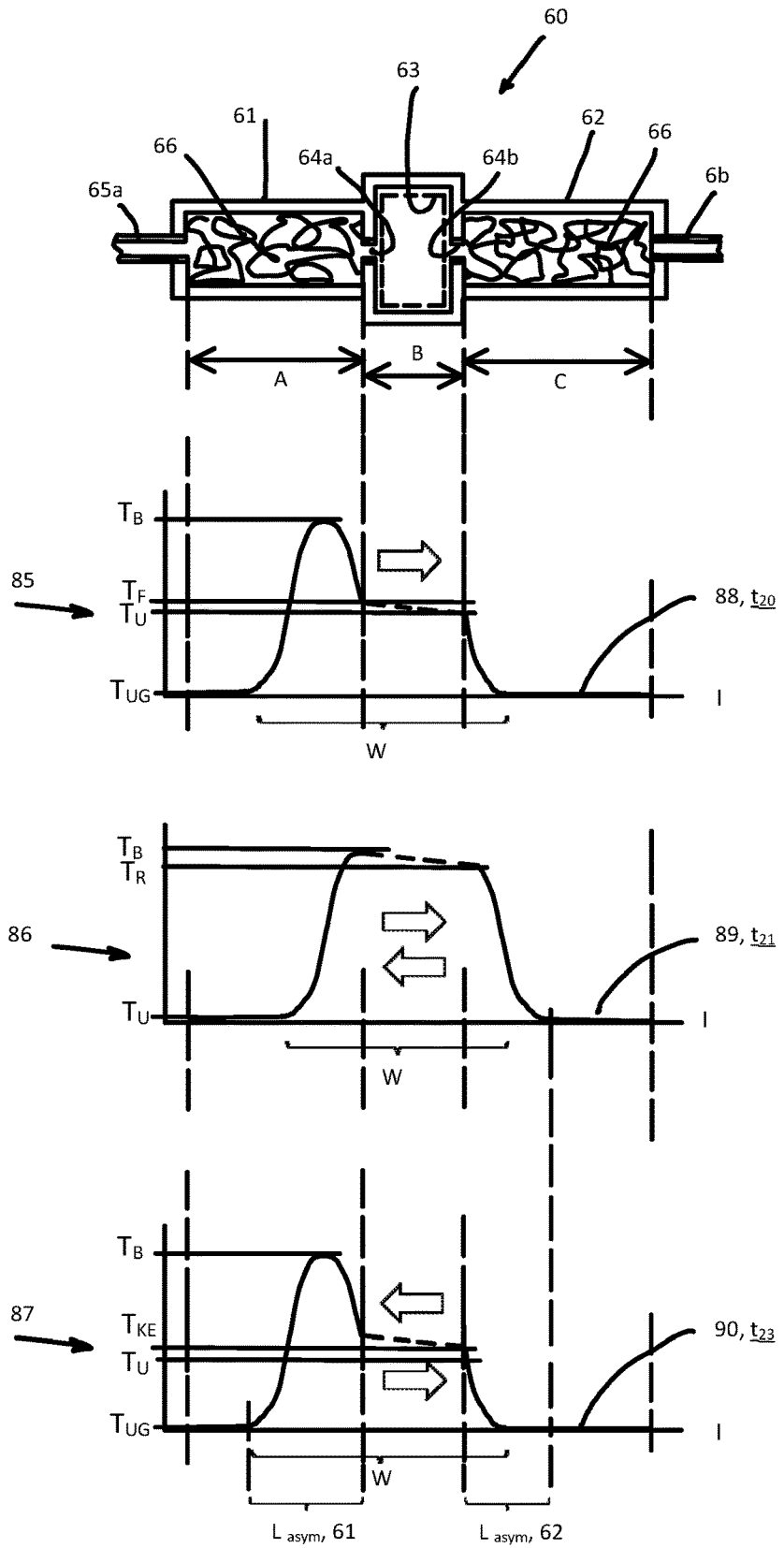
Figure 6:
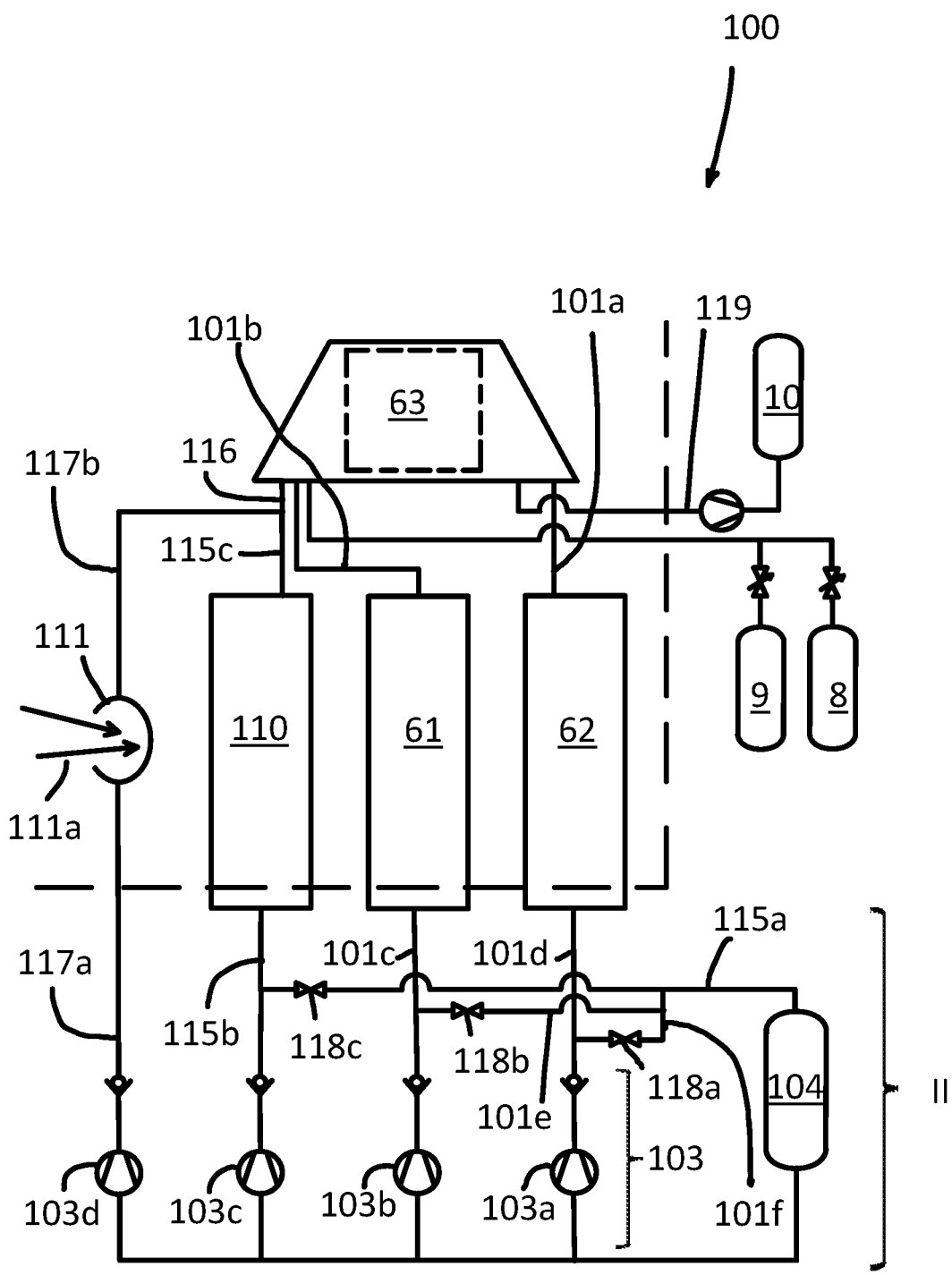
Figure 7A:
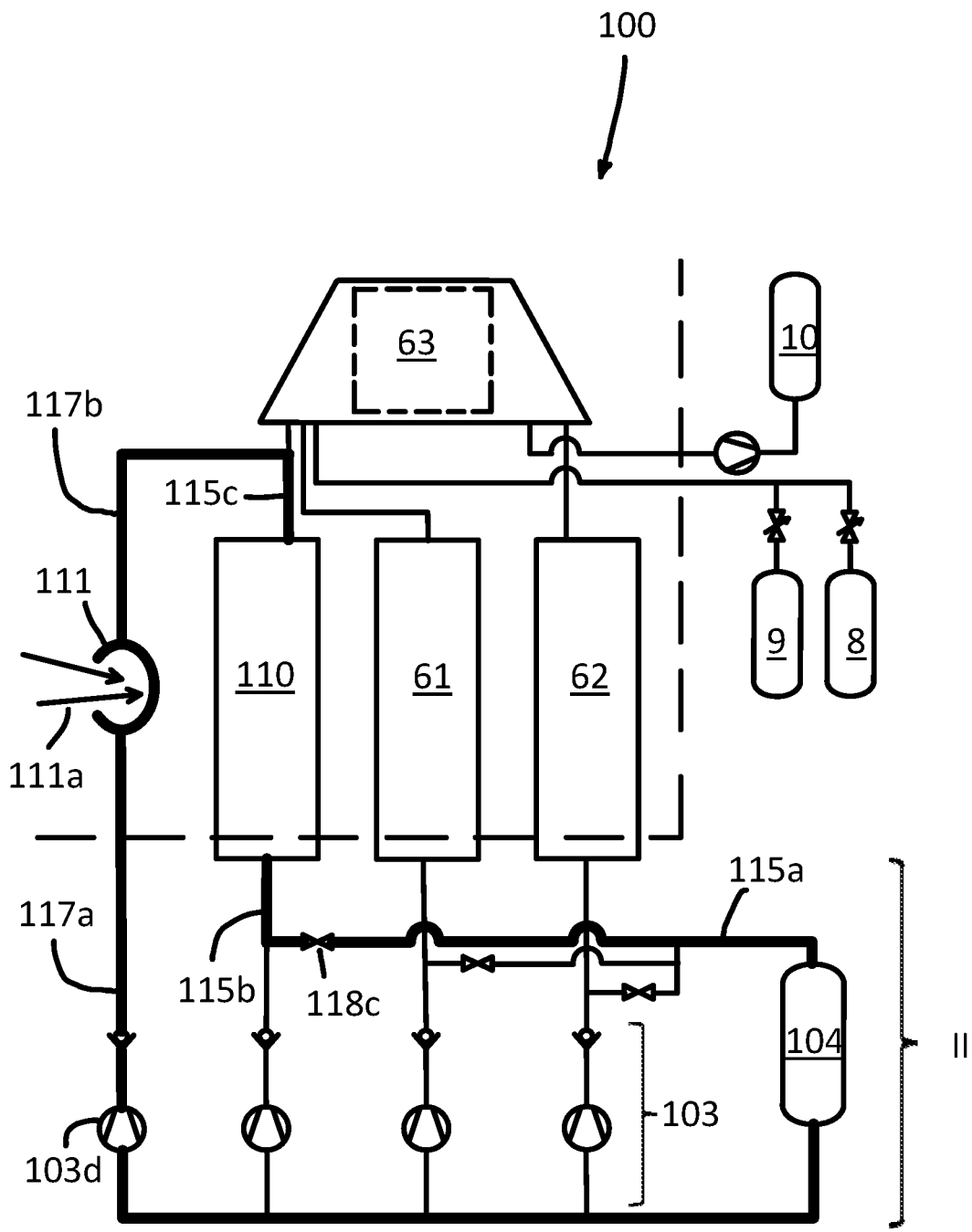
Figure 7B:
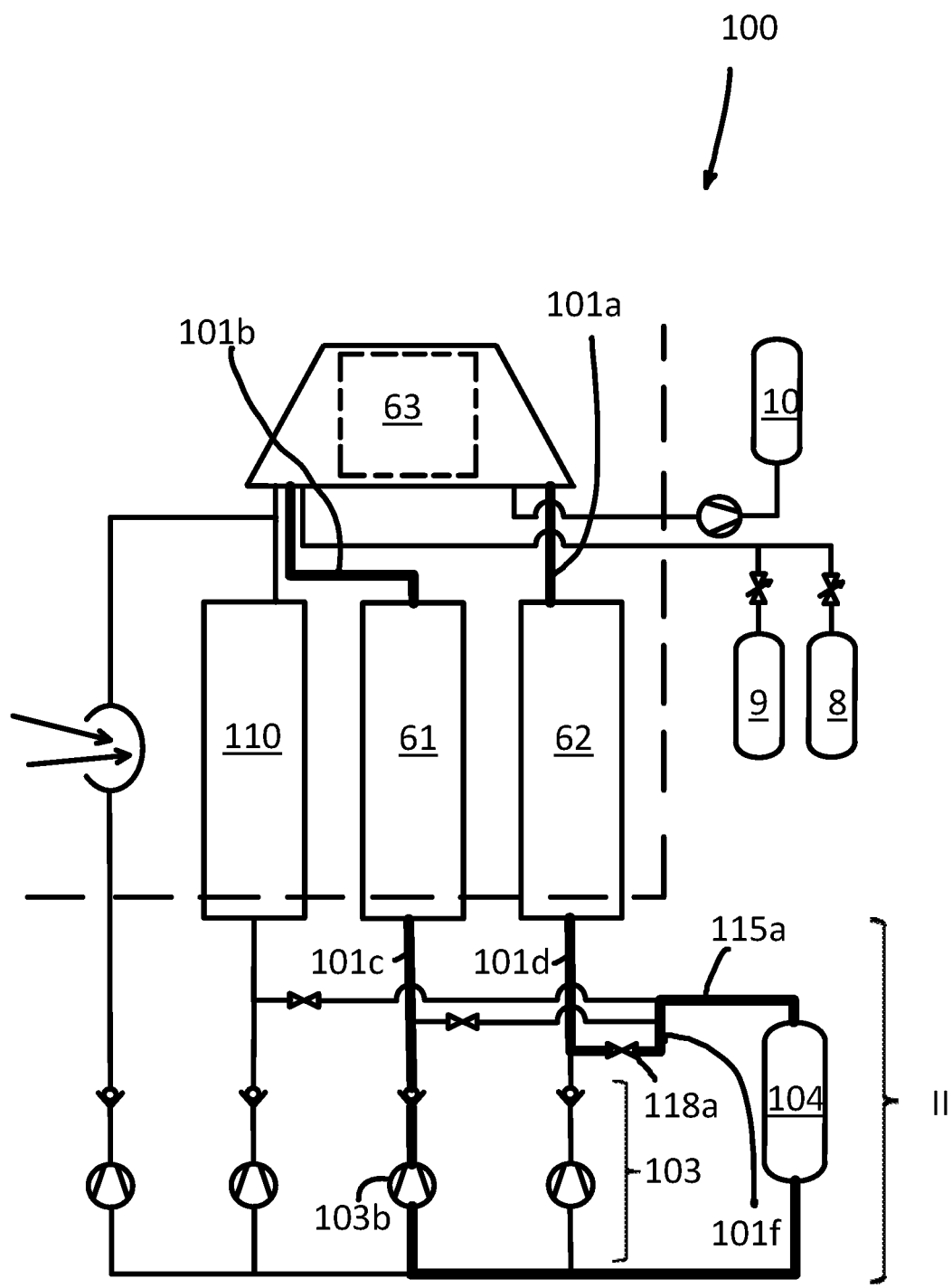
Figure 7C:
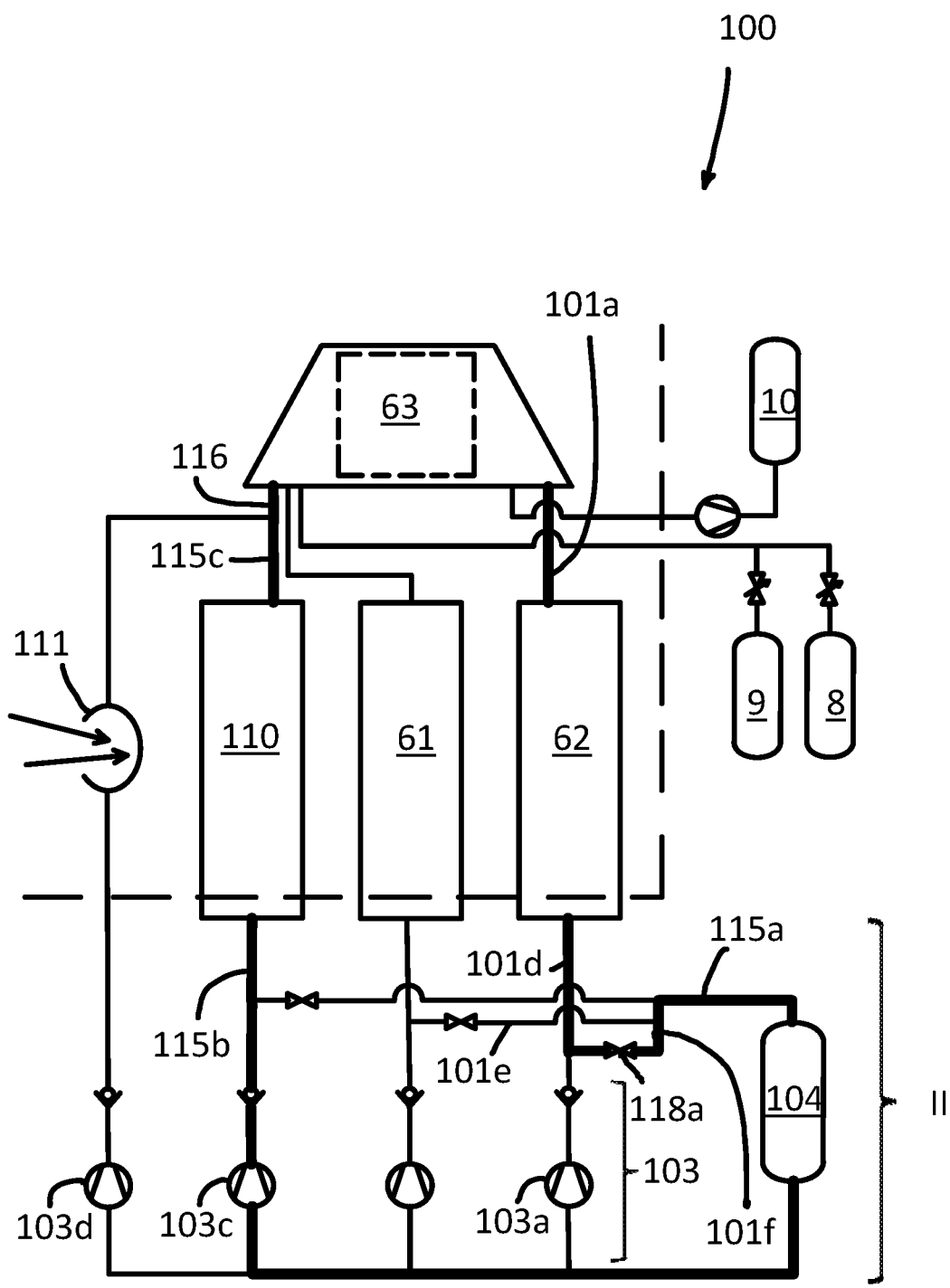
Figure 7D:
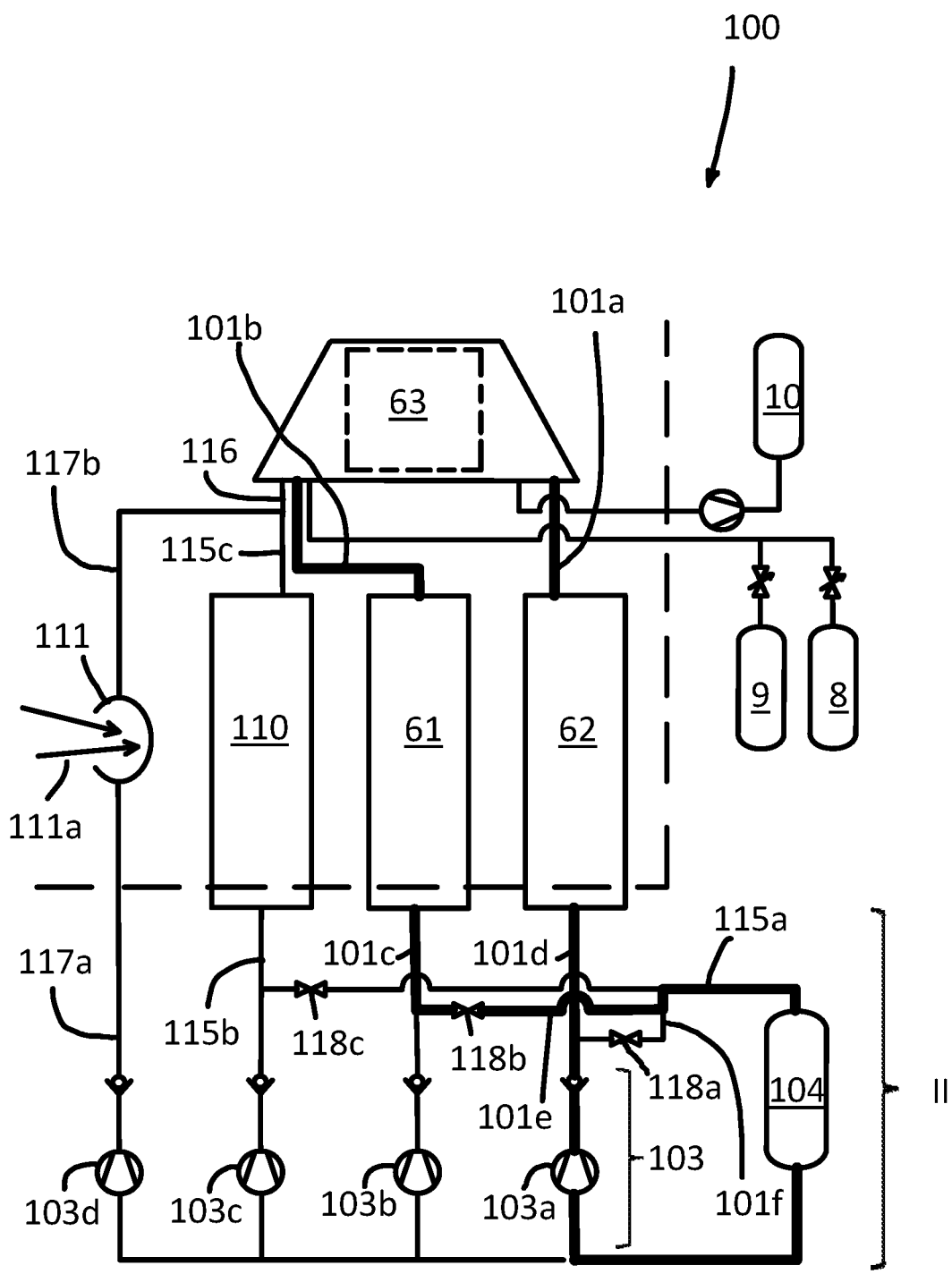
Figure 8:
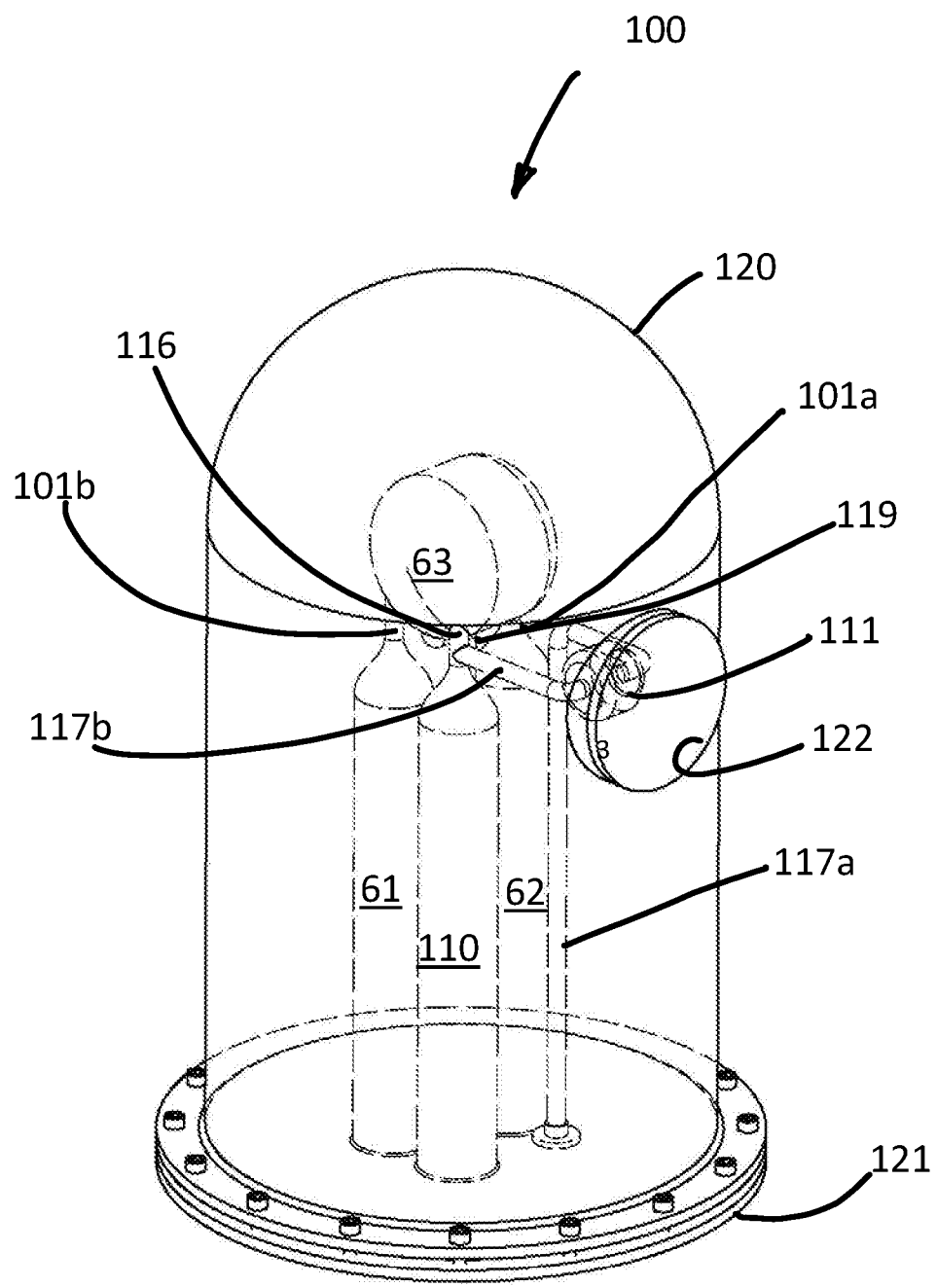

In the following text, the invention will be explained for exemplary purposes with reference to figures. In general, the same items are designated with the same reference numerals in the drawing. In the drawing:

FIG. 1 is a schematic representation of the processing system according to the invention having a serial heat accumulator circuit, a processing unit and a further heat accumulator, FIG. 2 is a temperature profile of the processing unit, FIG. 3 shows a preferred embodiment of a layered heat accumulator with graphs of the temperature distribution prevailing therein during operation, FIG. 4 shows a preferred embodiment of an inventive processing system with layered heat accumulators with graphs of the temperature distribution prevailing therein during operation, FIG. 5 shows the embodiment of the processing system of FIG. 4 with graphs of the temperature distribution prevailing therein in an alternative operating mode, FIG. 6 is a schematic representation of a further embodiment of the inventive processing system having a third heat accumulator for external heat, FIGS. 7a to 7d show the processing system of 6 in four different switching states, and FIG. 8 is a view of the warm side of a processing system created according to FIG. 6.

FIG. 1 shows an inventive processing system 1 with a processing unit 2 that can be operated between an upper and a lower temperature, wherein a first 3 and a second heat accumulator or storage 4 are connected to one another for operating purposes by a line arrangement L for a heat-transporting medium, and wherein processing unit 2 is disposed in a first section I of the line arrangement between the first 3 and the second heat accumulator 4. This configuration means that each heat accumulator 3, 4 has one end 3a, 4a facing processing unit 2 and one end 3b, 4b facing away from the processing unit, and the first section I of the line arrangement has line sections 5a, 5b, which connect heat accumulators 3, 4 to processing unit 2.

In the embodiment shown, processing unit 2 is in the form of a cerium reactor, which is suitable for the reactions described in ETH Dissertation No. 21864. For this purpose the input side thereof is connected via a line 16a to a $CO_2$ tank 8 through a valve 11 and to a H2O tank 9 through a valve 12, and the output side thereof is connected via a line 16b through a valve 13 and a pump 14 to a syngas tank 10, in which a gas mixture consisting mainly of CO and $H_2$ as the final products is collected.

It is further shown that the respective sides 3b, 4b of the first 3 and the second heat accumulator 4 facing away from processing unit 2 are connected to one another via a second section II of the line arrangement L through line arrangement 6 thereof. The two sections I and II of line arrangement L form a circuit for the heat transporting medium flowing therein, which may be argon, for example, which is also suitable for transporting heat at high temperatures.

A pump assembly 15 serves to maintain the flow direction of the heat-transporting medium in both directions of the circuit and to reverse it as necessary. For the sake of simplicity, in the diagram pump assembly 15 is represented with two pumps 15a and 15b, which can be switched into the circuit or decoupled therefrom via valves 15c and 15c. Of course, the person skilled in the art can 15 design the pump assembly according to the requirements of a given situation.

At this point, it should be noted that in a further embodiment—not shown—line section II may also be omitted. For example, the sides 3b, 4b of heat accumulators 3, 4 facing away from processing unit 2 are then open, that is to say they are in contact with the environment, so the heat-transporting medium may be ambient air passing through heat accumulators 3, 4, processing unit 2 and thus through line section I. Here too, the person skilled in the art will choose the closed circuit shown or an open arrangement depending on the specific circumstances (design of processing unit for any industrial process with the respective upper and lower temperatures). Finally, it is possible to provide tanks for the heat transporting medium instead of line section II on the respective sides facing away from processing unit 2 so that a medium other than ambient air may then be used as well.

As mentioned above, the processing unit 2 shown in the embodiment in the figure is designed as a cerium reactor, and in this case is operated cyclically with a lower temperature in the range of 1300° K for example, and an upper temperature in the range of 1800° K for example (here too, it is a simple matter for the person skilled in the art to specify all of the parameters according to the selected process). Accordingly, the reactor must be heated and then cooled again continuously. According to the invention, the heat that is transported away from the reactor at it is cooled is predestined to be stored in one of the heat accumulators 3, 4 and used for the subsequent (re)heating, and recovered in this way. An efficiency of 100% is not possible, with the consequence that during heating in an elevated temperature range up to the upper temperature (in this case 1800° K), heat must be supplied to the reactor from the outside, by the Sun 7, for example, which shines on processing unit 2 (in this case the cerium reactor) or also indirectly by another heat accumulator—not shown here to simplify to the figure—which in turn is charged by solar energy (or by heat acquired by some other means) (on this point, see FIG. 6 below). Thus, in the embodiment shown here processing unit 2 is designed as a solar reactor filled with cerium oxide (CeO2) and illuminated by the Sun 7.

FIG. 2 clearly shows a graph with a temperature profile in the processing unit 2 (FIG. 1) in the form of a cerium reactor, the operating temperature of which varies between the lower temperature $T_u$ (here 1300° K) and the upper temperature $T_o$ (here 1800° K).

Apart from a starting process, at time $t_u$ the heating begins of the reactor which is at the lower temperature $T_u$ using heat recovered from heat accumulators 3, 4 (FIG. 1). This raises the reactor temperature to $T_R$ (the temperature that can be reached using the recovered heat), which is reached at time $t_R$. For the further heating to $T_o$ (reached at time $t_o$), additional heat is needed, and this has to be supplied externally, as described previously, by the Sun shining on the reactor, for example. The temperature curve thus runs through points $P_u$, $P_R$ and $P_o$, wherein the efficiency of the recovery is given by the ratio of the areas under curve segments $P_u$ to $P_R$ and $P_R$ to $P_o$.

As the reactor is heated from $T_u$ to $T_o$, the cerium is reduced, $O_2$ is released and discharged from the reactor continuously through a pipe which is not shown in FIG. 1 to preserve clarity. After reaching $T_o$, at most traces of $O_2$ are present in the reactor, which cools slightly due to heat loss during the short residence time in the upper temperature range to temperature TK, the starting point of the reactor cooling. The heat that is extracted from the reactor until the end of cooling to temperature $T_{KE}$ at time $t_{KE}$ is saved in heat accumulators 3, 4. As soon as the reactor has reached the temperature $T_{KE}$, $O_2$ and $H_2O$ (preferably as steam) is fed into the reactor through line (FIG. 1), wherein the synthesis gas is formed by re-oxidation of the cerium and is transported to the syngas tank via line 16b (FIG. 1). During the re-oxidation, the reactor cools a little more to temperature $T_u$, which is reached at time $t_{UE}$.

Then the cycle can start again. It should be noted that the operating temperature $T_B$ of the heat accumulators 3, 4, i.e. the maximum temperature of the heat stored in them, is between $T_K$ and $T_R$ since a certain temperature difference between the heat exchanging medium and the reactor, that is to say the heat accumulators, is unavoidable.

According to FIG. 1, the reactor is cooled by the colder heat-transporting medium passing via line section 5a for example from the first heat accumulator 3 into the reactor (processing unit 2), where it is heated and then continues through line section 5b into the second heat accumulator 4, which is charged thereby, and when the flow direction is reversed can give off heat for heating the reactor in a process which can be repeated cyclically.

Particularly efficient recovery can be achieved if in accordance with a preferred embodiment of the invention the first 3 and the second heat accumulator 4 are designed as layered heat accumulators, i.e., heat accumulators which can be operated with a defined temperature distribution, thus yielding particularly high efficiency as well as a simple and inexpensive design according to the invention.

FIG. 3 is a schematic representation of a preferred embodiment of a layered heat accumulator unit 30, that is to say a heat accumulator which is able to create a temperature stratification with a predetermined temperature profile during operation, as is described below. The heat accumulator unit 30 shown here essentially has an elongated insulating cladding 31 and a heat storing bulk filling material 32 such as gravel for example, or finer or coarser rock (or other suitable materials) on. The ends of lines 30a and 30b for a heat transporting medium, in this case a gas such as ambient air or in the case of high operating temperatures argon as well, open into the unit. The gas or argon flows through the spaces in the bulk material through the length of heat accumulator 30, thereby giving heat off to the bulk material or absorbing heat from it, depending on whether heat is to be given to the heat accumulator 30 or taken from it.

FIG. 3 also shows diagrams 34, 40, 45 and 50 with various temperature distributions over the length of heat accumulator 30 depending on the current operating state, wherein the temperature interval from an ambient temperature $T_{UG}$ is sufficient to reach an operating temperature $T_B$. The operating states with a different flow direction of the gas or argon are shown, on the one hand from line 30a to line 30b, i.e. to the right and on the other hand reversed from line 30b to line 30a, i.e. to the left, corresponding to the direction of the arrows in the diagrams.

Diagram 34 shows the temperature distribution of the heat accumulator 30 initially at ambient temperature $T_{UG}$ while it is taking up heat, for which a gas at an operating temperature $T_B$ flows through it to the right, in the direction of the arrow.

Four temperature distribution curves 35 to 38 corresponding to the progressive charging times $t_i$ to $t_4$ are shown. When charging begins, the bulk material 32 located at the inlet to heat accumulator 30 heats up, causing the gas to lose its heat, so that the subsequent quantities of bulk material 32 are heated correspondingly less and the bulk material 32 quantities after those are heated less still due to the constant temperature loss of the gas. At time $t_1$, a temperature distribution is established which decreases in steps in the flow direction according to curve 35. The continued charging results in the stepped temperature distribution of curve 36 (time $t_2$), i.e. the step gains height with the increasing temperature of bulk material 32 at the inlet to heat accumulator 30, although the step moves only slightly in the flow direction. Finally, at time $t_3$ the bulk material on the inlet side has reached the operating temperature $T_B$ of the gas, so that as charging continues, the step advances through the bulk material 32 in the direction of flow, see the curve 37 at time $T_4$. In other words, a temperature step or ramp is created in the accumulator during charging and builds up at the beginning charging (curves 35 and 36) and then shifts in the flow direction as charging continues (curve 37) until it reaches the far end of heat accumulator 30 and has passed beyond this to some degree, so that the heat accumulator 30 which is fully charged at time $t_4$ has a temperature distribution corresponding to curve 38 at the level of operating temperature $T_B$. It should be noted that the gas entering at operating temperature $T_B$ leaves the heat accumulator at the lower ambient temperature $T_{UG}$ until the step reaches its outlet (here at line 30b).

Diagram 40 in FIG. 3 shows the temperature distribution when charging stops at time $t_3$, after which heat accumulator 30 is discharged by passing a gas at ambient temperature $T_{UG}$ through heat accumulator 30 in the reverse flow direction via line 30b. As mentioned earlier, charging stops at time $t_3$, the heat distribution thus corresponds to curve 37. At time $t_4$, the temperature step has shifted to the left, the heat distribution corresponds to curve 41. It should be noted that gas entering at ambient temperature $T_{UG}$ exits the heat accumulator at operating temperature $T_B$ until the step reaches the output thereof (here at line 30a).

Diagram 45 in FIG. 3 shows the temperature distribution in heat accumulator 30 when the temperature of the inflowing gas drops from $T_B$ while charging is not complete (but still with a flow direction to the right, i.e. from line 30a to line 30b, see the arrow direction), to $T_{UG}$ for example, in this example at time $t_2$ of diagram 34, i.e., after a temperature distribution as illustrated in curve 37 of diagram 40 has been established.

The inlet-side bulk material thus heats the gas entering at $T_{UG}$ up to the operating temperature $T_B$ and is thus cooled itself somewhat, although the gas which has now been heated to $T_B$ continues to flow to the right and accordingly heats the region of bulk material 32 located immediately beyond up to $T_B$, and loses more heat in the process, so that a region of bulk material 32 yet farther beyond the first region is still warmed, but to a lower temperature, and so on, thereby yielding a temperature distribution as reflected by curve 46 at time $t_{3*}$. The gas which continues to enter at temperature $T_{UG}$ cools the inlet-side bulk material 32 down further, but absorbs this heat and transports it in the flow direction—at time $t_{4*}$, the temperature distribution corresponds to curve 47 and as gas continues to enter at temperature $T_{UG}$ the temperature distribution by $t_{5*}$ corresponds to curve 48. In other words, the temperature distribution no longer has the form of a step, but rather a wave which passes through heat accumulator 30 in the flow direction. It should be noted that in this operating mode the gas enters and exits at the lower temperature $T_{UG}$ while the wave forms and runs through heat accumulator 30 in the direction of flow for the whole time until the wave reaches the outlet at line 30b, and only then does discharging of heat accumulator 30 begin, which lasts until the wave has passed completely "through" line 30b.

It should be pointed out that waves are formed in a wide variety of shapes, depending for example on how the temperature flowing into the heat accumulator changes. In the following text, the term "wave" will be used simply for all such possible wave forms.

Diagram 50 in FIG. 3 shows the temperature distribution in heat accumulator 30 when the flow direction is reversed at the moment when the temperature distribution corresponds to curve 48 (diagram 40) at time $t_{5*}$, so that the gas (still at lower temperature $T_{UG}$) then flows to the left, from line 30b to line 30a, see the direction of the arrow.

As mentioned earlier, the temperature distribution according to curve 48 at time $t_{5*}$ exists as the starting position at the moment when the flow direction is reversed, although now the wave propagates in the opposite direction of flow, to the left towards line 30a. There follows a period of time after the reversal of the flow direction I which the temperature distribution corresponds to curve 51 at time $t_{6*}$, and after that according to curve 52 at time $t_{7*}$. It should be noted that during the discharge of heat accumulator 30 shown in diagram 50 the gas flows in at ambient temperature $T_{UG}$ and initially also flows out at ambient temperature $T_{UG}$, until the preceding temperature edge of the wave has reached line 30a, wherein the rising edge of the wave then increases in accordance with the temperature up to the operating temperature $T_B$ and then drops again in accordance with the following falling edge until heat accumulator 30 is completely discharged.

During appropriate operation, i.e. in operation with only partial charging even when the heat-transporting gas flows through it continuously, heat accumulator 30 has a warm side and a cold side, see diagrams 34 and 40 of FIG. 3, wherein in this case the cold side remains substantially at ambient temperature $T_{UG}$, whereas the warm side reaches the operational temperature $T_B$. This also applies for the operation with a wave according to diagrams 45 and 50 if the wave is only shifted into heat accumulator 30 while the warm side of the heat accumulator has not yet fallen to the lower temperature (for example to the heat distribution of curve 47 in diagram 45).

FIG. 4 shows an inventive processing system 60 according to a preferred embodiment, with two layered heat accumulators 61, 62 which are constructed according to FIG. 3 so that they can accommodate a heat storing bulk material 66. A processing unit, here in the form of a cerium reactor 63, indicated only by a dotted line, is arranged between the first heat accumulator 61 and the second heat accumulator 62, wherein line segments 64a and 64b of a first section I of line arrangement L (FIG. 1) are visible, connecting cerium reactor 63 to heat accumulators 61, 62 for operating purposes. Also shown are the openings 65a and 65b of line 6—not shown to simplify the figure—of the second section II of line arrangement L (FIG. 1), which provide the circuit for the heat-transporting medium (argon again here) in both flow directions, namely to the right from opening 65a to opening 65b and in the reverse direction to the left from opening 65b to opening 65a.

The operation of processing system 60 now causes cerium reactor 63 according to FIG. 2 to be heated and cooled cyclically between an upper temperature $T_o$ and a lower temperature $T_u$, wherein the heat exchange between the first 61 and the second heat accumulator 62 and the reactor 63 is shown in diagrams 70 to 74, but in order to clarify the interaction between the heat accumulators initially without the external (solar) heat input between the recovery temperature $T_R$ and the upper temperature $T_o$ (see diagram 20, FIG. 2), instead starting from the operating temperature $T_B$ of heat accumulators 61, 62 between $T_R$ and $T_o$. Regarding the external heat supply see the following notes on 6 and 7a to 7d.

Diagrams 70 to 74 show temperature distribution curves 76 to 80 for different operating states of the arrangement of the cerium reactor 63 with the first 61 and the second heat accumulator 62, wherein sections A, B and C each display the area or length in the flow direction of the heat-transporting medium of the first heat accumulator 61, the cerium reactor 63 and second heat accumulator 62.

Diagram 70 shows temperature distribution curve 76 after a first part of a startup process of processing system 60 at time $t_0$. The first heat accumulator 61 is charged with heat in such manner that a temperature wave W is present with a peak temperature $T_B$, the wherein the edges of the wave W, fall to ambient temperature $T_{UG}$, here for example 300° K. Cerium reactor 63 and the second heat accumulator 62 are still at ambient temperature $T_{UG}$. For the second part of the startup, argon at ambient temperature $T_{UG}$ flows to the right from opening 65a through the first heat accumulator 61, cerium reactor 63 and heat accumulator 62 to opening 65b, see the direction of the arrow in diagram 70, with the result that wave W moves to the right, in the flow direction, as described in the notes on diagram 45, FIG. 3.

Diagram 71 shows the temperature distribution curve 77 at time $t_{10}$ wherein the temperature wave W has moved so far to the right in the direction of flow that the leading edge thereof has reached cerium reactor 63 and has partly passed through it, that is to say the argon has flowed through cerium reactor 63 with a rising temperature $T_F$ between $T_{UG}$ and $T_B$ of the edge and has heated it accordingly.

Since the temperature wave W penetrates cerium reactor 63 with a rising edge temperature $T_F$ starting from $T_{UG}$, it heats the reactor constantly, so that the temperature difference between $T_F$ and that of reactor 63 always remains small. Of course, the argon loses some heat as a result of this, see the temperature drop of temperature distribution curve 71 in section B, according to which the argon exits cerium reactor 63 at a temperature below $T_F$. Finally, the second heat accumulator 62 is heated by the incoming argon so that temperature distribution curve 77 has an edge in section C, see the description of FIG. 3, particularly diagram 34, curve 35 in this regard. Consequently, the heat stored in heat accumulator 61 is used for heating reactor 63, but also serves to charge heat accumulator 62.

Moreover, the wave W that is propagated through cerium reactor 63 some extent "does not see" this (with this exception of the temperature drop due to the transfer of heat between the argon and reactor 63), but of course is torn apart over the length of reactor 63 (section B), as is shown in temperature distribution curve 77.

In summary, the startup process is completed as soon as the temperature distribution corresponds to temperature distribution curve 77: reactor 63 is at $T_u$, wherein first heat accumulator 61 is charged with wave W in such manner that reactor 63 is brought to $T_B$ thereby and can then be cooled to $T_u$ again. In other words, reactor 63 at $P_u$ of the diagram 20 in FIG. 2.

Diagram 72 shows temperature distribution curve 78 later, at time $t_{11}$, wherein wave W has advanced so far into cerium reactor 63 that argon is flowing through it at the upper temperature $T_B$. The cerium reactor has thus been heated to a temperature $T_R$ (FIG. 2) close to the upper temperature $T_o$ and is at point $P_R$ on diagram 20, FIG. 2. According to the description of FIGS. 1 and 2, cerium reactor 63 is then preferably brought to $T_o$ (i.e. point $P_o$ in diagram 20) by the heat from sunlight, see the description of FIGS. 6 and 7 below.

Diagram 73 shows temperature distribution curve 79 at time $t_{12}$ wherein wave W has advanced farther through cerium reactor 63 between time $t_{11}$ and time $t_{12}$, so that now its trailing, falling edge is passing through it and the crest of wave W has propagated as far as the second heat accumulator 62. As long as the trailing edge of wave W is passing through it, cerium reactor 63 continuously gives off heat to the argon, since despite the ongoing loss of heat by the reactor 63, in accordance with the falling edge the argon is always cooler than the cerium reactor, which loses heat more slowly than the gas.

Again, the difference between the current temperature of the argon and of reactor 63 is small. At time $t_{12}$, reactor 63 is at point $P_{KE}$ of diagram 20, FIG. 2. For the re-oxidation of the cerium and the associated cooling of reactor 63 to $T_u$ (point $P_u$ in diagram 20, FIG. 2), the flow of argon may be stopped.

Then, the flow direction is switched to the left, in the direction of the bottom arrow, i.e. from line 65b to line 65a, whereupon wave W moves to the left and reactor 63 is in turn warmed by the passing of the leading, rising edge and then cooled by the trailing, falling edge thereof.

Diagram 74 shows temperature distribution curve 80 at time $t_{14}$, wherein wave W has passed so far through cerium reactor 63 that after heating to $T_R$ (and by external heat to $T_o$, see diagram 20, FIG. 2), the reactor has cooled back down to $T_{KE}$ is cooled and the corresponding heat is stored in heat accumulator 61.

In summary, after a starting process according to diagram 70, processing system 60 has a temperature distribution according to diagram 71, wave W is then sent through reactor 63 in a flow direction (in this case: to the right) so that the temperature distribution according to diagram 73 is present, and from there wave W is then sent back through the cerium reactor 63 in the opposite flow direction (in this case: to the left) until the temperature distribution according to diagram 74 is present, serving as the starting point for a new cycle, i.e. in the one flow direction to the state according to diagram 73 and then back in the other flow direction to the state according to diagram 74, and so on for as long as the process is to run. Starting from the middle of reactor 73, the wave W moves to symmetrically located end positions in heat accumulators 61 and 62. After the starting process, the wave extends along the length $L_{SYM}$ of cerium reactor 63 into both heat accumulators 61, 62, or sections A and C, see diagram 74 in conjunction with diagram 73. This means that during operation both heat accumulators are always at ambient temperature $T_{UG}$, that is to say cold, at the outer sections thereof around openings 65a and 65b, while inside of the processing system a cyclical heat exchange takes place between reactor 63 and heat accumulators 61, 62 due to the wave W which is continuously travelling back and forth as shown in diagrams 73, 74.

FIG. 5 shows a further embodiment of the invention in which the process is not symmetrical (FIG. 4), but takes place asymmetrically in that a wave W passing to the right through reactor 63 is stopped when the temperature distribution corresponds to diagram 72 (FIG. 4). By way of explanation, FIG. 5 shows such a sequence with diagrams 85 to 87, corresponding to diagrams 71, 72 and 74 of FIG. 4, that is to say the temperature distribution curves 88 to 90 thereof (at times $t_{20}$ to $t_{23}$) are the same as temperature distribution curves 77, 78 and 80. As mentioned, however, the point in time at which the flow direction is reversed is changed, and this takes place when corresponding to diagram 86 the temperature distribution according to curve 89 is present.

As a result, reactor 63 is heated starting from the state according to the diagram 85 until the state according to diagram 86 and is cooled after the flow is reversed starting from the state according to diagram 86 to that of diagram 87 after which the cycle begins again. Accordingly, the oscillating wave W penetrates less deeply into second heat accumulator 62 than is the case for first heat accumulator 61, so that the end positions of the accumulators are no longer symmetrical, but asymmetrical. The corresponding lengths $L_{ASYM}$ are plotted in diagram 87 in conjunction with diagram 86. It follows that the second heat accumulator 62 may advantageously be designed to be shorter than is the case in the embodiment according to FIG. 4m while of course both outer ends of the heat accumulators 61, 62 are also always at ambient temperature $T_{UG}$ in the region of openings 65a and 65b, and so remain cold.

The heat losses during the heat exchange described with reference to FIGS. 4 and 5 are small, the efficiency of the heat recovery achieved in this way is high. Moreover, in conjunction with the description of FIG. 2 the person skilled in the art will have no difficulty in defining the switching times for the flow in a specific situation with regard to any process involving cyclically alternating temperature. In particular, the person skilled in the art may determine the temperature difference to which the reactor 63 is exposed during heating and cooling from the slope of the edges of wave W and the speed with which it moves through reactor 63, and conversely this also makes it possible to design it exclusively for small temperature differences as defined beforehand In the embodiment of processing system 60 described in FIGS. 4 and 5, the first 61 and the second heat accumulator 62 collectively have a heat-storing filler of bulk material 66, wherein the heat-transporting medium is preferably a gas, particularly preferably argon.

Furthermore, the respective sides of heat accumulators 61 and 62 facing away from reactor 63 (at openings 65a and 65b) always run at ambient temperature $T_{UG}$ during operation, while the sides thereof facing towards reactor 63 around the line sections 64a and 64b (after the start process) always work at elevated temperatures between $T_u$ and $T_B$, the peak temperature of the (oscillating) wave W.

Accordingly, during operation the first heat accumulator (61) and the second heat accumulator (62) each have a cold side, and a second section (II) of the line arrangement (L) is provided which connects these cold sides to one another. The cold sides may also be in contact with the environment or with other systems even if second section II is not present, as is the case in one embodiment described with reference to FIG. 1. It should be added here that in actual operation the cold sides may become slightly warm over time. The person skilled in the art may then provide a cooling unit for the heat-transporting medium in second section II of line arrangement L appropriate for the given situation should this be necessary, or may also configure the processing system so that it can cool down during the interruptions that occur during solar operation (night-time).

FIGS. 4 and 5 also show that heat accumulators 61, 62 are connected to each other via lines 64a and 64b (Section I of line arrangement L), while according to FIG. 1 all the switching elements necessary for operation of the processing system, such as the pump assembly 15 may be provided in second section II of line arrangement L—with the advantage that the switching elements are arranged on the cold side, and are thus unburdened by high temperatures, and can be of correspondingly simple construction. On the hot side, where temperatures may reach above 1300° K or 2300° K or more depending on the application, simple pipe connections such as ceramic pipes are sufficient. It follows that switching members for operating both the first and second sections of the line arrangement are preferably arranged in the second section of the line arrangement. In this context, the first line section is particularly preferably free of switching elements for operating the processing system. Heat accumulators 60, 61 must be constructed with a minimum length so that the cold side thereof does not exceed ambient temperature $T_{UG}$ during operation. This minimum length is illustrated graphically in FIGS. 4 and 5 with a length $L_{SYM}$ and $L_{ASYM}$ which is assigned to each heat accumulator 60, 61—these relate to the segments in sections A and C that the wave W requires in order to travel back and forth. Lengths $L_{SYM}$ and $L_{ASYM}$ of heat accumulator 61 in the embodiments according to FIGS. 4 and 5 are the same size, while length $L_{ASYM}$ of the heat accumulator 62 in FIG. 5 is shorter than the $L_{SYM}$ of the heat accumulator 62 in FIG. 4 because the wave W does not penetrate as far into heat accumulator 62.

Consequently, the person skilled in the art is able to dimension the length of the heat accumulators in the embodiment of FIG. 4 to minimally $L_{SYM}$ and in one embodiment according to FIG. 5 the length of the one heat accumulator (here the second heat accumulator 62) shorten it further to $L_{ASYM}$, which makes manufacturing easier.

At this point it should also be emphasised that the cold side of the heat accumulators is at ambient temperature $T_{UG}$ for most applications. Depending on the specific case, however, it may be appropriate for the cold sides, i.e. the sides of the heat accumulators facing away from the processing unit are at a higher temperature during operation, up to 400° C. for example or even higher—for example if the heat transporting fluid still circulates in other systems connected to the processing system or itself is in heat exchange contact with such other systems. In the present case, however, the term "cold side" is always used to distinguish these sides from the warm side of heat accumulators. The person skilled in the art may provide a starting process which is specifically designed for operation with a cold side that is at higher than ambient temperature $T_{UG}$,—the operating principle described in FIGS. 3 to 5 according to the invention is not changed thereby.

From the preceding description relating to FIGS. 1 to 5 and also according to the embodiments described in FIGS. 6 to 8, a method is also revealed for cyclically heating and cooling a processing unit 2 that is operable between an upper and a lower temperature, characterized in that the processing unit is switched for operating purposes between a first 3 and a second heat accumulator 4, wherein in a charged state the first 3 and the second 4 heat accumulators give off heat in the upper temperature range and the temperature tends towards the lower temperature during discharge, wherein during charging the first 3 and the second 4 heat accumulators can be charged with heat initially in the lower temperature range and subsequently in the upper temperature range, and wherein said processing unit 2 is brought alternately to the upper temperature and the lower temperature by cyclically changing the flow direction of a heat transporting medium flowing through the first 3 and the second 4 heat accumulators—and thus also through the processing unit 2.

In this context, one flow direction is preferable maintained before the cyclic reversal, until processing unit 2 has been heated from the lower temperature to a recovery temperature and subsequently cooled again to the lower temperature (see the embodiment of FIG. 4).

Also preferably, the heat accumulators are operated with a wave-like temperature stratification which forms a wave W. The reversal of the flow direction is particularly preferably clocked in such manner that the wave advances into and retreats out of both heat accumulators to the same distance in a continuous, constant propagation in symmetrical operation. Alternatively, the change of flow direction may also be clocked in such manner that the wave advances a shorter distance into and retreats from one heat accumulator than the other in continuous asymmetrical oscillating operation, preferably until the peak temperature thereof.

The advantages that are achievable according to the invention with a cold (and hot) side of the heat accumulators are derived particularly effectively if preferably in operation the wave W does not fully reach the sides of the heat accumulators facing away from the processing unit, such that these sides remain below a predetermined temperature, and preferably does not reach them at all, such that these sides remain cold.

Finally, the person skilled in the art can also adjust the flow to the processing unit in such manner that a current temperature difference between the heat transporting medium flowing through the processing unit and the processing unit itself does not exceed a predetermined value.

In all the embodiments shown, the processing unit can be configured as either a directly or indirectly irradiated solar reactor.

FIG. 6 shows a schematic diagram of a processing system 100, in which the external heat, here solar energy, is introduced between points $P_R$ and $P_O$ in diagram 20 of FIG. 2 indirectly, i.e. without direct illumination of the processing unit 2 (FIG. 1) by the Sun.

Again, a processing unit in the form of a cerium reactor 63 is shown, processing unit, with which the lines for circulating the heat transporting medium and all the reagents needed are in operating communication. The diagram shows lines 101a and 101b of a first section I of a line arrangement L, and a second section II of the line arrangement L with a pump assembly 103 having pumps 103a and 103b, each of which is equipped with a check valve, and a tank 104 for the heat transporting medium, here again argon. Also visible are the $CO_2$ tank 8, the $H_2O$ tank 9 and the syngas tank 10 (see also the description associated with FIG. 1). A first heat accumulator 61, and a second heat accumulator 62 are constructed according to the embodiment shown in FIG. 4. To this extent, and apart from direct illumination of the reactor 63 by the Sun 7 (FIG. 1) the processing system 100 corresponds to that of FIG. 1.

In addition, however, a third heat accumulator 110 and a solar receiver 111 for sunrays 111a must also be considered, wherein both can be switched into the circuit of the heat transporting medium, and receiver 111 and heat accumulator 110 are designed to generate and store heat to at least the upper temperature $T_o$. The third heat accumulator 110 is preferably designed as a layered heat accumulator according to FIG. 3 and is charged and discharged in accordance with diagram 40 of FIG. 3. It is also connected to argon tank 104 in the second section of line arrangement L via lines 115a and 115b (via a pump 103c there) and connected to a feed line to reactor 63 in the form of a line 116 via line 115c. Solar receiver 111 is in turn connected to argon tank 104 via line 117a (via pump 103d) and is optionally switchably connected either to line 116 or to line 115c via line 117b, so that heat transporting medium (here: argon) warmed thereby can be conveyed either directly to reactor 63 or into third heat accumulator 110, driven by pump 103d in line 117a. Valves 118a to 118c regulate the flow and the path of the heat-transporting medium in processing system 100 with lines 101c to 101f and together with check valves assigned to pumps 103a to 103d.

It should be pointed out that the dashed line drawn in processing system 100 in the figure represents the boundary between the warm side thereof, which includes the reactor 63, and its cold side, in which all switching elements such as valves and the pump assembly 103 are arranged. The advantageous arrangement according to the invention is made evident again, according to which all switching devices may be disposed easily and inexpensively in the cold area (preferably ambient temperature $T_{UG}$), whereas in the warm area, at temperatures between $T_R$ and $T_o$, which may exceed 1300° K or 2300° K, only pipes for the heat transporting medium and substance which react or are formed in the reactor must be provided, and these may be made simply and inexpensively from ceramic for example.

Line 117b forms a third section III and line 115c a fourth section IV of line arrangement L.

This means that according to the embodiment shown, a feeder 116 for the heat transporting medium in the upper temperature range is arranged upstream of the processing unit in first section I of line arrangement L, more preferably a solar receiver for heating the heat transporting medium is provided, wherein a third section of the line arrangement connects the solar receiver to the feed, and finally, particularly preferably, a third heat accumulator is provided and is connected to the feed via a fourth section of the line arrangement, wherein heat from the solar receiver may be stored in this third heat accumulator.

The embodiment according to FIG. 6 shows that the receiver may be arranged separately from the processing unit (for example a reactor for chemical reactions or another unit for recovering heat) for any solar powered processing system, either in direct connection with a processing unit of the processing system, or indirectly via a heat accumulator assigned to the receiver.

FIGS. 7a to 7d show how processing system 100 can be switched for the various operating phases of the reactor 63 shown in FIG. 2 (and also for the method steps described above), in which case heat accumulators 61 and 62 preferably according to FIGS. 4 and 5 are operated.

FIG. 7a shows a switching state of processing system 100 in time period $t_O$ to $t_K$ or $t_{KE}$ to $T_{UE}$ (see FIG. 2, diagram 20, with points $P_O$ to $P_K$ and $P_{KE}$ to $P_{UE}$), in which the reduction of the cerium is finished and the re-oxidation is taking place, so that here there is no heat transporting medium flowing through reactor 63. During these periods, $t_R$ to $t_O$ or in period $t_{KE}$ to $t_{UE}$ heat from solar receiver 111 may be stored to third heat accumulator 110 via the heat-transporting medium (here: Argon). For this purpose, pump 103d displaces argon from tank 104 through receiver 111, where it absorbs heat, then through lines 117b and 115c into heat accumulator 110, which is thus charged with heat, and finally cooled to ambient temperature $t_{UG}$, back into tank 104. The lines involved in this circuit are highlighted in bold in the figure.

FIG. 7b shows a switching state of processing system 100 for a flow direction to the right in the embodiments of FIGS. 4 and 5, that is to say for example in the period $t_U$ to $t_R$ or between points $P_U$ to $P_R$ (see FIG. 2), in which reactor 63 is heated by recovered heat, that is to say heat stored in the first heat accumulator 61. Initially, the temperature distribution in heat accumulators 61, 62 is according to diagram 71 of FIG. 4 or diagram 85 of Figure depending on the embodiment according to which the processing system is operated. For this purpose, pump 103b displaces argon from tank 104 through receiver, through the first heat accumulator 61, then through line 101b into reactor 63, and from here through line 101a into second heat accumulator 62, which is thus charged with heat, and finally cooled to ambient temperature $t_{UG}$, back into tank 104. The lines involved in this circuit are highlighted in bold in the figure.

However, this switching state is also present in period $t_K$ to $t_{KE}$ or between points $P_K$ to $P_{KE}$ (see FIG. 2) when heat is extracted from the reactor 63 which is to be cooled and stored in heat accumulator 62 for recovery, as shown in diagram 73 of FIG. 4. Then, as it cools, argon flows from heat accumulator 61 and through the reactor 63, where it absorbs the heat thereof and stores it in heat accumulator 62.

FIG. 7c shows a switching state of processing system 100 in the period $t_R$ to $t_O$ or between points $P_R$ to $P_O$ (see FIG. 2), in which the reactor 63 is brought to the upper temperature $T_O$ by the external heat stored in the third heat accumulator 110 (in this case from receiver 111). As was indicated earlier, heat accumulator 110 may also be charged by forms of energy other than solar energy—and an energy source other than the Sun might be used instead of receiver 111 to introduce heat into processing system 100.

For this purpose, pump 103c displaces argon from tank 104 through heat accumulator 110, where it absorbs heat, then through lines 115c and 116 into reactor 63, and from here through line 101a into heat accumulator 62, which is thus charged with heat to above $T_R$, and finally cooled to ambient temperature $t_{UG}$, back into tank 104. The lines involved in this circuit are highlighted in bold in the figure.

Alternatively, pump 103d may be switched in, so that heat-transporting medium warmed simultaneously by receiver 111 and the third heat accumulator 110 flows into the reactor through line 116. Likewise, only pump 103d can be activated, not pump 103c, so that the switching state of processing system 100 corresponds to that of FIG. 1 with direct illumination of the reactor by the Sun.

It should be emphasized that in diagram 73 of FIG. 4 and in diagram 86 of FIG. 5, the peak temperature of wave W is represented without this charging with heat above $T_R$, since in these diagrams the motion of wave W as a result of the construction of the processing system 60 illustrated there is under discussion. However, in a switching state of an inventive processing system according to FIG. 7c, efficiency is increased still further by the external heat recovered in this way. It should also be noted that this helps to avoid the small, steady fall of the peak temperature of the travelling wave in diagrams 45 and 50 of FIG. 3, so that temperatures $T_R$ and $T_O$ can really be kept for an indefinite operating period. The person skilled in the art can easily configure processing system 100 according to the requirements of the specific circumstances.

FIG. 7d shows a switching state of processing system 100 for a flow direction to the left in the embodiments of FIGS. 4 and 5, that is to say for example for a returning wave W as shown in diagram 73 of FIG. 4 in the period $t_U$ to $t_R$ or between points $P_U$ to $P_R$ (see FIG. 2), in which reactor 63 is heated by recovered heat, that is to say unlike FIG. 7B, heat not stored in first heat accumulator 61 but in second heat accumulator 62. However, returning wave W causes the cooling of reactor 73 in period $t_K$ to $t_{KE}$ or between points $P_K$ to $P_{KE}$ (see FIG. 2), wherein heat is extracted from the reactor 63 to be cooled and now stored for recovery in heat accumulator 61.

For this purpose, pump 103a displaces argon from tank 104 through heat accumulator 62, then through line 101a into reactor 63, and from there through line 101b into heat accumulator 61, and finally cooled to ambient temperature $t_{UG}$, back into tank 104. The lines involved in this circuit are highlighted in bold in the figure.

FIG. 8a shows a view of the hot side of an processing system 100 built and operating according to the diagram of FIG. 6. The figure shows a cladding 120 for the additional element on the warm side, and a connection flange 121 for attaching the cladding 120 to at the installation location of reactor 63.

The figure does not show the second section II of line assembly L or tanks 8 to 10 for $CO_2$, $H_2O$ and the syngas tank 10, in which the gas mixture consisting mainly of CO and $H_2$ is collected as the final products. All these components can be easily designed and positioned by a person skilled in the art according to specific circumstances, since they only need to be configured for the area of the ambient temperature $T_{UG}$ range (or another relatively low temperature depending on the specific case) and, as indicated earlier, comparatively costly high-temperature-switching devices and high temperature pumps in the hot area of line arrangement L can be dispensed with.

The first, second and third heat accumulators 61, 62 and 110, the reactor 63 and the receiver 111, which is arranged behind a transparent section provided in the cladding 120 for sunrays are shown inside cladding 2. Also visible are the line for cold heat transporting medium 117a leading to receiver 111, lines 117b and 116 leading away from the receiver 111 towards reactor 63, and lines 101a and 101b of the first section I of line arrangement L. Slightly hidden behind heat accumulator 110 is line 119 from reactor 63 to the tank 10 for syngas, which is not shown here (FIG. 6).

The invention claimed is:

1. A method for cyclic heating and cooling of a processing unit that is operable between an upper and a lower temperature, wherein a first process step occurs at the upper temperature and a second process step occurs at the lower temperature, wherein the processing unit is adapted as a reactor which is adapted to produce synthesis gas and operatively switched between a first and a second heat accumulator,
- wherein in a charged state the first and the second heat accumulators give off heat in the upper temperature range and the temperature tends towards the lower temperature during discharge,
- wherein during charging the first and the second heat accumulators can be charged with heat initially in the lower temperature range and subsequently in the upper temperature range,
- wherein said processing unit is brought alternately to the upper temperature and the lower temperature by cyclically changing a flow direction of a heat transporting medium flowing through the first and the second heat accumulators—and thus also through the processing unit,
- wherein a flow direction before the cyclic reversal is maintained until the processing unit has been heated from the lower temperature to a recovery temperature and subsequently cooled back down to the lower temperature, and
- wherein the flow is synchronised with the processing unit in such manner that a current temperature difference between the heat transporting medium flowing through the processing unit and the processing unit does not exceed a predetermined value.

2. The method according to claim 1, wherein the heat accumulators are operated with a wave-like temperature stratification which forms a wave.

3. The method according to claim 2, wherein the change of the flow direction is clocked in such a way that the wave continuously advances into and retreats out of both heat accumulators to the same distance in a continuous, constant propagation in symmetrical operation.

4. The method according to claim 2, wherein the change of the flow direction is clocked in such a way that the wave advances into one heat accumulator a shorter distance than the other and retreats therefrom in continuous asymmetrical oscillating operation, preferably until the peak temperature thereof.

5. The method according to claim 2, wherein the wave does not reach the sides of the heat accumulators facing away from the processing unit during operation, such that these sides remain cold.

6. The method according to claim 1, wherein the processing unit is designed as a directly illuminated solar reactor.

7. A processing system comprising a processing unit which can be operated between an upper and a lower temperature, wherein a first process step takes place at the upper temperature and a second process step takes place at the lower temperature, wherein a first heat accumulator and a second heat accumulator are operatively interconnected by means of a line arrangement for a heat-transporting medium, wherein the processing unit is adapted as a reactor which is adapted to produce synthesis gas and arranged in a first section of the line arrangement between the first and the second heat accumulator, wherein the line arrangement and each of the first heat accumulator and the second heat accumulator are adapted for a flow of heat transporting medium to the processing unit in both the upper temperature and the lower temperature, wherein a feed for the heat transporting medium is arranged in the upper temperature region in the first section of the line arrangement upstream of the processing unit, a solar receiver is provided for heating the heat-transporting medium, wherein a third section of the line arrangement connects the solar receiver with the feed, and wherein a third heat accumulator is provided, which is connected to the feed by a fourth section of the line arrangement in such manner that heat from the solar receiver can be stored in the third heat accumulator.

8. The processing system according to claim 7, wherein the first heat accumulator and the second heat accumulator are connected by means of a second section of the line arrangement on the respective side facing away from the processing unit.

9. The processing system according to claim 8, wherein a cooling unit for the heat-transporting medium is arranged in the second section of the line arrangement.

10. The processing system according to claim 8, wherein switching elements for operating the first and the second section of the line arrangement are arranged in the second section of the line arrangement.

11. The processing system according to claim 7, wherein the first heat accumulator and the second heat accumulator are in the form of layered heat accumulators.

12. The processing system according to claim 7, wherein the first heat accumulator and the second heat accumulator have a heat storing filling of bulk material and the heat transporting medium is a gas.

13. The processing system according to claim 7, wherein the first heat accumulator and the second heat accumulator each have a cold side during operation.

14. The processing system according to claim 13, wherein a second section of the line arrangement is preferably provided which connects said cold sides to each other.

15. The processing system according to claim 7, wherein the first line section is free of switching elements for the operation of the processing system.

16. The processing system according to claim 7, wherein the processing unit is constructed as a solar reactor which is illuminated by the Sun.

* * * * *